US010615849B2

(12) United States Patent
Miwa et al.

(10) Patent No.: US 10,615,849 B2
(45) Date of Patent: Apr. 7, 2020

(54) POWER RECEIVING DEVICE AND POWER FEEDING SYSTEM (71) Applicant: SEMICONDUCTOR ENERGY LABORATORY CO., LTD., Atsugi-shi, Kanagawa-ken (JP)

(72) Inventors: Misako Miwa, Miyagi (JP); Koichiro Kamata, Kanagawa (JP); Shuhei Maeda, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 516 days.

(21) Appl. No.: 15/583,446

(22) Filed: May 1, 2017

(65) Prior Publication Data
US 2017/0237470 A1    Aug. 17, 2017

Related U.S. Application Data (63) Continuation of application No. 13/804,883, filed on Mar. 14, 2013, now Pat. No. 9,641,223.

(30) Foreign Application Priority Data

Mar. 26, 2012 (JP) ................ 2012-069626

(51) Int. Cl.
*H04B 5/00* (2006.01)
*B60L 11/18* (2006.01)
(Continued)

(52) U.S. Cl.
CPC ............ *H04B 5/0037* (2013.01); *B60L 53/12* (2019.02); *H02J 7/025* (2013.01); *H02J 50/20* (2016.02); *H02J 50/80* (2016.02); *H04B 5/0093* (2013.01)

(58) Field of Classification Search
CPC ..... H04B 5/0037; H04B 5/0093; H02J 7/025; H02J 50/80; H02J 50/20; B60L 53/12
(Continued)

(56) References Cited

U.S. PATENT DOCUMENTS 8,054,036 B2   11/2011   Onishi et al.
8,319,489 B2   11/2012   Ide
(Continued)

FOREIGN PATENT DOCUMENTS

EP   2431213 A    3/2012
JP   2002-101578 A   4/2002
(Continued)

OTHER PUBLICATIONS

Kurs.A et al., "Wireless Power Transfer via Strongly Coupled Magnetic Resonances", Science, Jul. 6, 2007, vol. 317, No. 5834, pp. 83-86.
(Continued)

*Primary Examiner* — Rexford N Barnie
*Assistant Examiner* — Thai H Tran
(74) *Attorney, Agent, or Firm* — Nixon Peabody LLP; Jeffrey L. Costellia (57) ABSTRACT A power receiving device and a power feeding system which are capable of performing communication and power feeding at the same time are provided. Further, a power receiving device and a power feeding system which are capable of stably performing communication during power feeding are provided. One embodiment of the present invention relates to a power receiving device which includes an antenna for communication and power feeding that receives AC power, a rectifier circuit that rectifies the received AC power including the modulation signal into DC power, a smoothing circuit that smoothes the resulting DC power, a power storage device that stores the smoothed DC power, a com-
(Continued)

munication control unit that analyzes the modulation signal included in the AC power, and a transformer that is positioned between the antenna and the rectifier circuit and changes a reference potential of the AC power, and a power feeding device.

15 Claims, 7 Drawing Sheets

(51) Int. Cl.
  *H02J 50/20*  (2016.01)
  *H02J 50/80*  (2016.01)
  *H02J 7/02*  (2016.01)
  *B60L 53/12*  (2019.01)

(58) Field of Classification Search
  USPC .......................................... 307/104; 320/108
  See application file for complete search history.

(56) References Cited

U.S. PATENT DOCUMENTS

| | | | |
|---|---|---|---|
| 8,854,011 | B2 | 10/2014 | Ichikawa et al. |
| 2002/0065061 | A1 | 5/2002 | Schiltz |
| 2002/0089369 | A1 | 7/2002 | Ikeda |
| 2008/0197804 | A1 | 8/2008 | Onishi et al. |
| 2009/0102292 | A1 | 4/2009 | Cook et al. |
| 2009/0322307 | A1* | 12/2009 | Ide .......................... H02J 5/005 323/355 |
| 2010/0097830 | A1 | 4/2010 | Wang |
| 2010/0187913 | A1 | 7/2010 | Smith et al. |
| 2011/0254377 | A1* | 10/2011 | Wildmer ............... B60L 11/182 307/104 |
| 2012/0223593 | A1* | 9/2012 | Kamata ................. H02J 7/0004 307/104 |
| 2013/0069585 | A1* | 3/2013 | Kamata ................... H02J 5/005 320/108 |
| 2013/0154385 | A1 | 6/2013 | Miwa et al. |
| 2013/0154556 | A1 | 6/2013 | Takahashi et al. |
| 2013/0241301 | A1 | 9/2013 | Maeda et al. |
| 2014/0028250 | A1* | 1/2014 | Nishino ................. H02J 7/025 320/108 |

FOREIGN PATENT DOCUMENTS

| | | |
|---|---|---|
| JP | 2006-180073 A | 7/2006 |
| JP | 2008-206232 A | 9/2008 |
| JP | 2009-011129 A | 1/2009 |
| JP | 2009-189231 A | 8/2009 |
| JP | 2009-240099 A | 10/2009 |
| JP | 2010-011654 A | 1/2010 |
| JP | 2010-119246 A | 5/2010 |
| JP | 2010-193598 A | 9/2010 |
| JP | 2010-239690 A | 10/2010 |
| JP | 2010-252468 A | 11/2010 |
| JP | 2010-284058 A | 12/2010 |
| JP | 2010-284066 A | 12/2010 |
| JP | 2011-029799 A | 2/2011 |
| JP | 2011-061893 A | 3/2011 |
| JP | 2011-147278 A | 7/2011 |
| JP | 2011-166883 A | 8/2011 |
| JP | 2011-223716 A | 11/2011 |
| JP | 2012-005185 A | 1/2012 |
| JP | 2012-060730 A | 3/2012 |
| JP | 2012-060731 A | 3/2012 |
| WO | WO-2010/131348 | 11/2010 |

OTHER PUBLICATIONS

Miyamoto.T et al., "Wireless Power Transfer System with a Simple Receiver Coil", IMWS 2011 (2011 IEEE MTT-S International Microwave Workshop Series), May 12, 2011, pp. 131-134.

Karalis.A et al., "Efficient wireless non-radiative mid-range energy transfer", Annals of Physics, 2008, vol. 323, pp. 34-48.

* cited by examiner

POWER RECEIVING DEVICE AND POWER FEEDING SYSTEM

BACKGROUND OF THE INVENTION

1. Field of the Invention

One embodiment of the invention disclosed herein relates to a power receiving device and a power feeding system.

2. Description of the Related Art

Various electronic appliances have spread, and a variety of products is shipped to the market. In recent years, portable electronic devices such as cellular phones and digital video cameras have widely spread. Further, electric propulsion moving vehicles that are powered by electric power, such as electric cars, appear on the market as products.

In such mobile phones, digital video cameras or electric propulsion vehicles, power storage devices serving as power storage means (referred to as batteries and storage batteries) are incorporated. Currently, power feeding to such a power storage device is performed in most cases by direct connection to a household AC power source which is a power feeding means. In addition, a structure without a power storage device or a structure which does not use electric power fed to a power storage device is directly fed with power from a household AC power source through a wiring or the like so that a unit operates.

On the other hand, methods by which electric power is fed to power storage devices without making contact or electric power is fed to loads without making contact have been researched and developed. Typical methods are an electromagnetic coupling method (also referred to as electromagnetic induction method, see Patent Documents 1 and 2), a radio wave method (also referred to as microwave method), and a magnetic resonant method (also referred to as resonant method, see Patent Documents 3 and 4).

As described in Patent Document 3, in a contactless power feeding technique using a magnetic resonant method, a device that receives electric power (hereinafter, referred to as power receiving device) and a device that supplies power (hereinafter, referred to as power transmitting device) each have a resonant coil. Further, in each of the power receiving device and the power transmitting device, an electromagnetic induction coil is provided. Feeding of power from a power source to the resonant coil in the power transmitting device and feeding of power from the resonant coil to a load in the power receiving device are conducted by the electromagnetic induction coils.

The power transmitting device includes a first LC resonant circuit including a resonant coil and a capacitor. The power receiving device includes a second LC resonant circuit including a resonant coil and a capacitor. The resonance frequency (LC resonance) of each of the first LC resonant circuit and the second LC resonant circuit is adjusted so that a magnetic resonance phenomenon between the first LC resonant circuit and the second LC resonant circuit occurs at a predetermined frequency.

When the resonant coil of the power transmitting device and the resonant coil of the power receiving device face each other, they makes a magnetic resonance phenomenon, and thereby efficient power transfer is realized even when the distance between the resonant coils is large (see Non-Patent Document 1).

REFERENCE

Patent Document

[Patent Document 1] Japanese Published Patent Application No. 2011-223716
[Patent Document 2] Japanese Published Patent Application No. 2009-189231
[Patent Document 3] Japanese Published Patent Application No. 2011-29799
[Patent Document 4] Japanese Published Patent Application No. 2011-166883

Non-Patent Document

[Non-Patent Document 1] "Wireless power feeding 2010, all about contactless charging and wireless energy transfer" Nikkei Electronics, March 2010, pp. 66-81.

SUMMARY OF THE INVENTION

In each of power transmission systems disclosed in Patent Documents 1 to 4, power transmission and communication for sending information of a power receiving side to a power transmitting side are performed using an antenna on the power receiving side and an antenna on the power transmitting side.

In the case where both communication and power transmission are performed using the one antenna on the power transmitting side and the one antenna on the power receiving side, a communication period (using low power) and a power feeding period (using high power) should be temporally separated from each other. The separation causes a situation where power feeding cannot be performed during communication and a situation where communication cannot be performed during power feeding.

If communication and power feeding are separated temporally, communication (data transmission and reception) cannot be performed during power feeding, which considerably reduces flexibility in changing the timing of data transmission and reception. Accordingly, delay in transmission of information of the receiving side (e.g., the value of input power for the power receiving side or the value of a charging voltage of a power storage device provided on the power receiving side) might occur.

Further, if communication and power feeding are separated temporally, power feeding cannot be performed during communication, and thus the power receiving side cannot receive power constantly.

When power feeding cannot be performed during communication, the charging rate for the power storage device is lower than that in the case of charging with a contact-type charging system like direct charge through a cord.

In the case where power which is received by the power receiving side is consumed in a load (e.g., an electric appliance), when a period during which power is not supplied is caused, the load (electric appliance) might not operate.

In view of the foregoing, an object of one embodiment of the disclosed invention is to provide a power receiving device and a power feeding system which are capable of performing communication and power feeding at the same time.

Further, when communication and power feeding are performed at the same time, a reference potential of an electromagnetic wave for communication deviates from a reference potential of DC power for power feeding, so that the reference potential of the electromagnetic wave for communication might become unstable. The unstableness of the reference potential of the electromagnetic wave for communication might cause a state where communication itself cannot be performed.

Thus, an object of one embodiment of the disclosed invention is to provide a power receiving device and a power feeding system which are capable of performing stable communication during power feeding.

In the power feeding system capable of performing communication and power feeding at the same time, an antenna of a power receiving device receives AC power; after that, a modulation signal included in the received AC power is sent to a communication control unit; and then a control circuit of the communication control unit analyzes the modulation signal. Thus, the power receiving device can receive information of a power transmitting device and an instruction which are included in the modulation signal.

The received AC power is rectified into DC power by a rectifier circuit. The DC power is stored in a power storage device provided in the power receiving device. Part of the DC power stored in the power storage device is used as power for driving the communication control unit.

Figure 3:
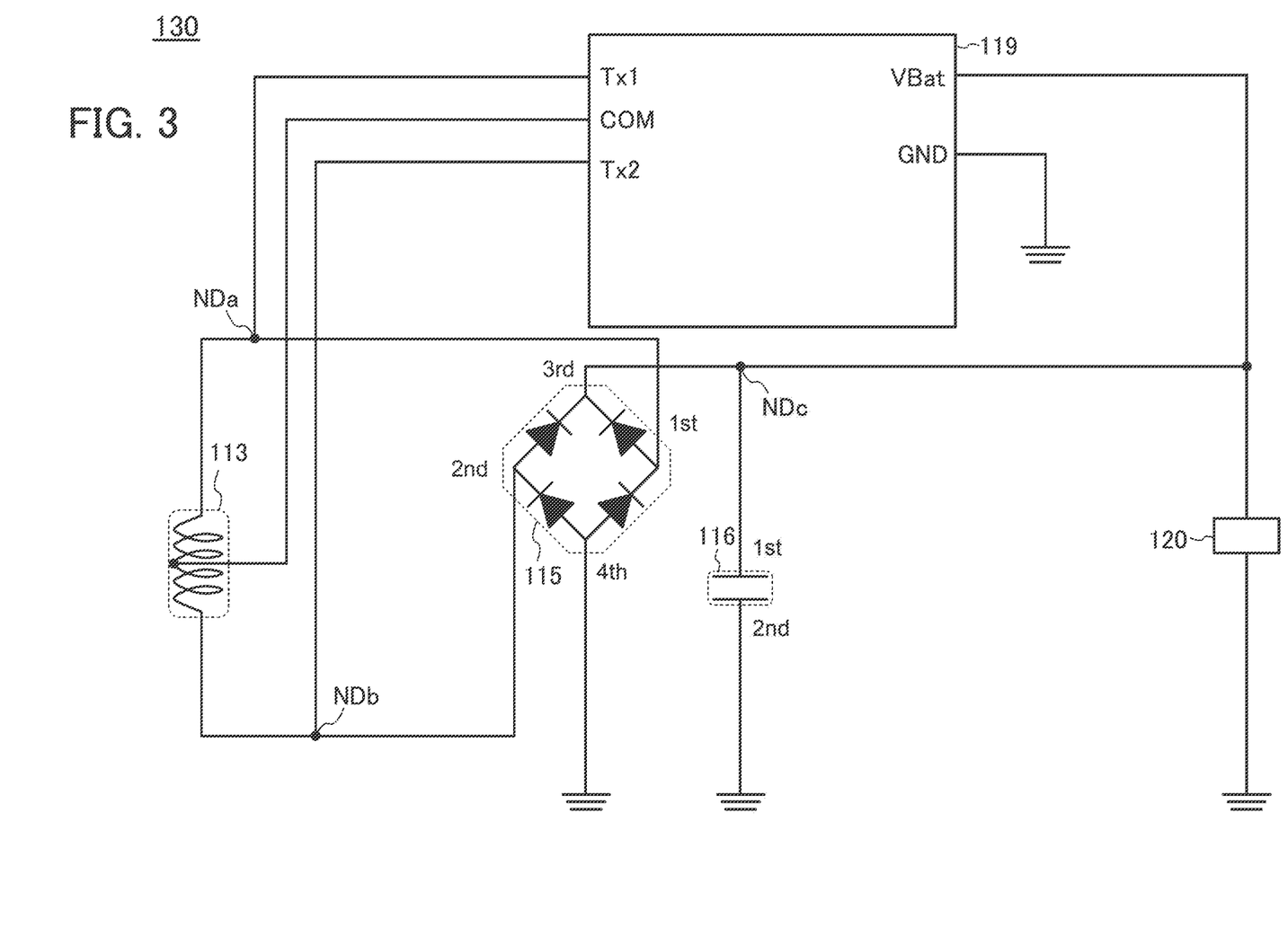
FIG. 3 illustrates a power receiving device.

FIG. 3 illustrates the power receiving device capable of performing communication and power feeding at the same time. A power receiving device 130 illustrated in FIG. 3 includes an electromagnetic coupling coil 113 that is an antenna, a rectifier circuit 115, a smoothing circuit 116, a power storage device 120, and a communication control unit 119.

One terminal of the electromagnetic coupling coil 113, a first terminal of the rectifier circuit 115, and a terminal Tx1 of the communication control unit 119 are electrically connected to a node NDa. The other terminal of the electromagnetic coupling coil 113, a second terminal of the rectifier circuit 115, and a terminal Tx2 of the communication control unit 119 are electrically connected to a node NDb. The center point of the electromagnetic coupling coil 113 is electrically connected to a terminal COM of the communication control unit 119.

A third terminal of the rectifier circuit 115, a first terminal of the smoothing circuit 116, a positive electrode of the power storage device 120, and a terminal VBat of the communication control unit 119 are electrically connected to a node NDc. A fourth terminal of the rectifier circuit 115 is grounded.

The rectifier circuit 115 functions as an AC-DC converter which converts AC power into DC power. To obtain high rectification efficiency, full-wave rectification is used for the rectifier circuit 115. The rectifier circuit 115 illustrated in FIG. 3 is a bridge rectifier circuit including four diodes.

The smoothing circuit 116 has a function of smoothing DC power output from the rectifier circuit 115 by storing and releasing the DC power. In the power receiving device 130 in FIG. 3, a capacitor is used as the smoothing circuit 116. A second terminal of the smoothing circuit 116 is grounded. Note that the smoothing circuit 116 is not necessarily provided unless needed.

The power storage device 120 has a function of storing the DC power. A positive electrode of the power storage device 120 is electrically connected to the node NDc and a negative electrode of the power storage device 120 is grounded.

The communication control unit 119 analyzes the modulation signal (transmission signal) included in the AC power which has been transmitted from the power transmitting device to the power receiving device. The communication control unit 119 analyzes the modulation signal by reading amplitude modulation of the voltage amplitude of the input AC power. Thus, the power receiving device can receive information of the power transmitting device and an instruction which are included in the modulation signal.

Note that the power receiving device 130 which has received the AC power including the modulation signal (transmission signal) transmits reflection power to the power transmitting device (not illustrated). The reflection power includes a modulation signal (response signal) including information of the power receiving device 130. The power transmitting device receives the reflection power including the response signal and analyzes the response signal, thereby obtaining the information of the power receiving device 130. In this manner, the communication between the power transmitting device and the power receiving device 130 is established.

A ground potential GND is applied to a terminal GND of the communication control unit 119. The communication control unit 119 is driven using a potential VBat which is applied to the terminal VBat of the communication control unit 119 and the ground potential which is applied to the terminal GND, as a reference potential.

On the other hand, AC power as an electromagnetic wave which is received by the antenna of the power receiving device is input to the terminal Tx1 and the terminal Tx2 of the communication control unit 119.

Figure 2A:
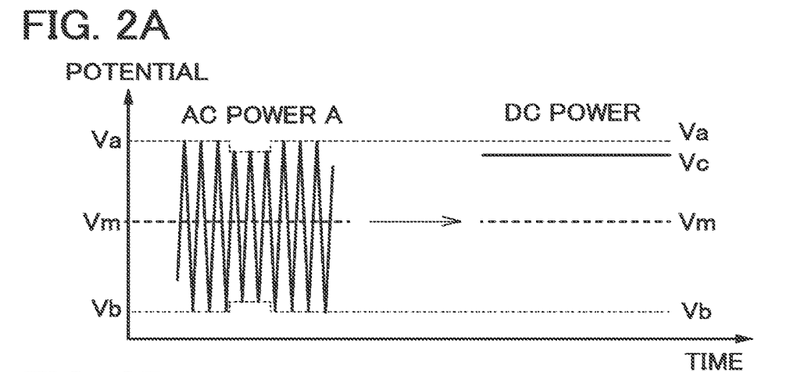
FIGS. 2A to 2C show AC power and DC power.

Here, FIG. 2A shows the voltage amplitude of the AC power which is not yet rectified by the rectifier circuit 115 and the maximum potential and the minimum potential of the DC power which has been rectified by the rectifier circuit 115. Note that in FIGS. 2A to 2C, the horizontal axis represents time and the vertical axis represents potential. The potentials of the node NDa, the node NDb, and the node NDc are a potential Va, a potential Vb, and a potential Vc, respectively. The potential Vc of the DC power which has been rectified by the rectifier circuit 115 and the potential GND that is the ground potential each serve as the reference potential in driving the communication control unit 119, as described above.

Note that the AC power which is received by the antenna of the power receiving device 130 is power (an electromagnetic wave) which is obtained by modulating AC power (a carrier wave) which is generated by an AC power source described later. Therefore, the potential of the DC power which is obtained by rectifying the modulated power (electromagnetic wave) is the potential Vc at a maximum, which is lower than the potential Va, and is the ground potential at a minimum. The DC power obtained by the rectification is smoothed by the smoothing circuit 116 and then the power storage device is charged with the resulting power. The maximum potential of a charging power for the power storage device 120 can be regarded as the potential Vc and the minimum potential thereof can be regarded as the potential GND. In other words, a charging voltage for the power storage device can be regarded as Vc-CGND.

As shown in FIG. 2A, AC power A which is received by the antenna (the electromagnetic coupling coil 113) of the power receiving device 130 is an electromagnetic wave having the potential Va as the maximum potential and the potential Vb as the minimum potential. When the AC power is rectified by the rectifier circuit 115, DC power having the potential Vc is generated on the positive side of a potential Vm of the center point of the antenna of the power receiving device 130 which is regarded as a reference potential. Note that in this specification, the potential Vm of the center point of the antenna is an intermediate potential of a difference between the potential Va and the potential Vb; thus, the potential Vm is also referred to as an intermediate potential of the AC power.

In the case where the communication control unit 119 is driven by the DC power generated in the above manner, the potential Vc is applied to the terminal VBat of the communication control unit 119.

Further, as described above, the AC power A which has the potential Va as the maximum potential and the potential Vb as the minimum potential and has the modulation signal is input to the terminal Tx1 and the terminal Tx2 of the communication control unit 119. At this time, the reference potential Vm of the AC power may be changed by influence by a potential change in the communication control unit 119 (see FIG. 2B).

Figure 2B:
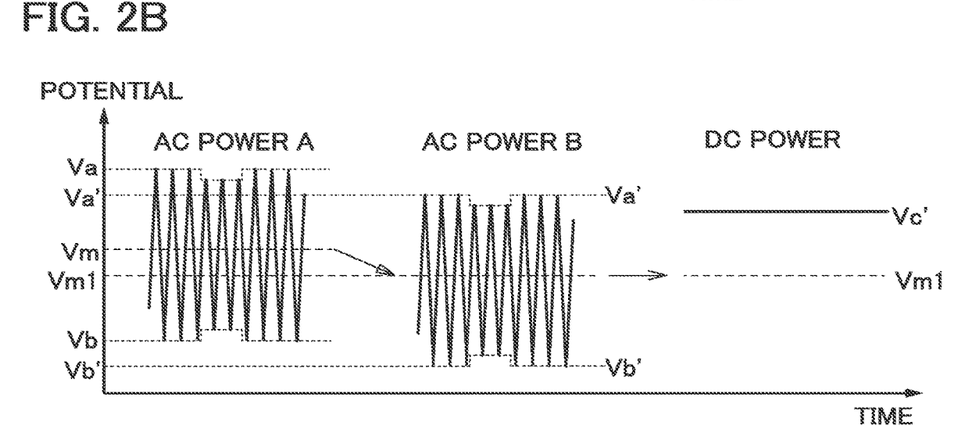

For example, in FIG. 2B, AC power which has the potential Va, the potential Vb, and the potential Vm as the maximum potential, the minimum potential, and the reference potential, respectively, is the AC power A, and AC power which has a potential Vm1 as a reference potential which is obtained as a result of a change in the reference potential of the AC power A is AC power B. The AC power B has the potential Vm1 (Vm1<Vm) as the reference potential, a potential Va' (Va'<Va) as the maximum potential, and a potential Vb' (Vb'<Vb) as the minimum potential.

When AC power like the AC power B is supplied to the rectifier circuit 115, the potential of the node NDc which is generated is a potential Vc' which is lower than the potential Vc. Note that in the case where the potential Vm1 is higher than the potential Vm, the potential Vc' is higher than the potential Vc. In this manner, when the reference potential of the AC power input to the rectifier circuit 115 is unstable, the potential Vc to be generated is also unstable, which might interrupt communication, and further, might cause breakage of a driving circuit of a communication control system.

In order to perform stable communication and further prevent breakage of the driving circuit of the communication control system, AC power is input to the rectifier circuit 115 so as not to be influenced by the potential change in the communication control unit 119 in one embodiment of the disclosed invention. Specifically, a transformer is provided between an antenna of a power receiving device and a rectifier circuit.

When the transformer is provided between the antenna of the power receiving device and the rectifier circuit, even if the AC power (including a modulation signal) which is input from the antenna to the communication control unit 119 is influenced by the potential change in the communication control unit 119, the potential Vc can be stable because the transformer transmits only the voltage amplitude.

Thus, stable communication can be performed in the power receiving device and the power feeding system of one embodiment of the disclosed invention. Further, it is possible to prevent breakage of the driving circuit of the communication control system in the power receiving device and the power feeding system according to one embodiment of the disclosed invention.

One embodiment of the disclosed invention relates to a power receiving device including an antenna for communication and power feeding that receives AC power including a modulation signal, a rectifier circuit that rectifies the received AC power including the modulation signal into DC power, a smoothing circuit that smoothes the resulting DC power, a power storage device that stores the smoothed DC power, a communication control unit to which the AC power including the modulation signal is input and which analyzes the modulation signal included in the AC power and is driven using a potential of the DC power and a ground potential, and a transformer that is positioned between the antenna and the rectifier circuit and changes a reference potential of the AC power input to the communication control unit.

In one embodiment of the disclosed invention, the communication control unit includes a control circuit that analyzes the modulation signal, a wireless interface portion that converts the modulation signal into a signal which can be analyzed by the control circuit, and a reference voltage generator that generates a reference potential of the control circuit and a reference potential of the wireless interface portion, from the potential of the DC power and the ground potential.

One embodiment of the disclosed invention relates to a power feeding system including a power transmitting device including a first control circuit that generates a modulation signal, a modulation circuit that converts the modulation signal into a signal which can be wirelessly communicated, and a first antenna that sends AC power including the modulation signal; and a power receiving device including a second antenna for communication and power feeding that receives the AC power including the modulation signal, a rectifier circuit that rectifies the AC power including the modulation signal received by the second antenna into DC power, a smoothing circuit that smoothes the resulting DC power, a power storage device that stores the smoothed DC power, a communication control unit to which the AC power including the modulation signal is input and which analyzes the modulation signal included in the AC power and is driven using a potential of the DC power and a ground potential, and a transformer that is positioned between the second antenna and the rectifier circuit and changes a reference potential of part of the AC power input to the communication control unit.

In one embodiment of the disclosed invention, the communication control unit includes a second control circuit that analyzes the modulation signal, a wireless interface portion that converts the modulation signal into a signal which can be analyzed by the second control circuit, and a reference voltage generator that generates a reference potential of the second control circuit and a reference potential of the wireless interface portion, from the potential of the DC power and the ground potential.

According to one embodiment of the disclosed invention, a power receiving device and a power feeding system which are capable of performing communication and power feeding at the same time can be provided.

Further, according to one embodiment of the disclosed invention, a power receiving device and a power feeding system which are capable of performing stable communication during power feeding can be provided.

DETAILED DESCRIPTION OF THE INVENTION

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiments. Note that, in the drawings hereinafter shown, the same portions or portions having similar functions are denoted by the same reference numerals, and repeated description thereof will be omitted. Further, in some cases, the same hatching patterns are applied to similar parts, and the similar parts are not necessarily designated by reference numerals.

Note that the position, size, range, or the like of each structure shown in the drawings and the like is not accurately represented in some cases for easy understanding. Therefore, the disclosed invention is not necessarily limited to the position, size, range, or the like as disclosed in the drawings and the like.

In this specification and the like, ordinal numbers such as "first", "second", and "third" are used in order to avoid confusion among components, and the terms do not mean limitation of the number of components.

In addition, in this specification and the like, the term such as "electrode" or "wiring" does not limit a function of a component. For example, an "electrode" is sometimes used as part of a "wiring", and vice versa. Furthermore, the term "electrode" or "wiring" can include the case where a plurality of "electrodes" or "wirings" is formed in an integrated manner.

Note that in this specification and the like, the term "electrically connected" includes the case where components are connected through an object having any electric function. There is no particular limitation on an object having any electric function as long as electric signals can be transmitted and received between components that are connected through the object. Examples of an "object having any electric function" are a switching element such as a transistor, a resistor, an inductor, a capacitor, and an element with a variety of functions as well as an electrode and a wiring.

Note that in this specification and the like, the term such as "over" or "below" does not necessarily mean that a component is placed "directly on" or "directly under" another component. For example, the expression "a gate electrode over a gate insulating film" can mean the case where there is an additional component between the gate insulating film and the gate electrode.

Embodiment 1

<Structure of Power Feeding System>

Figure 5:
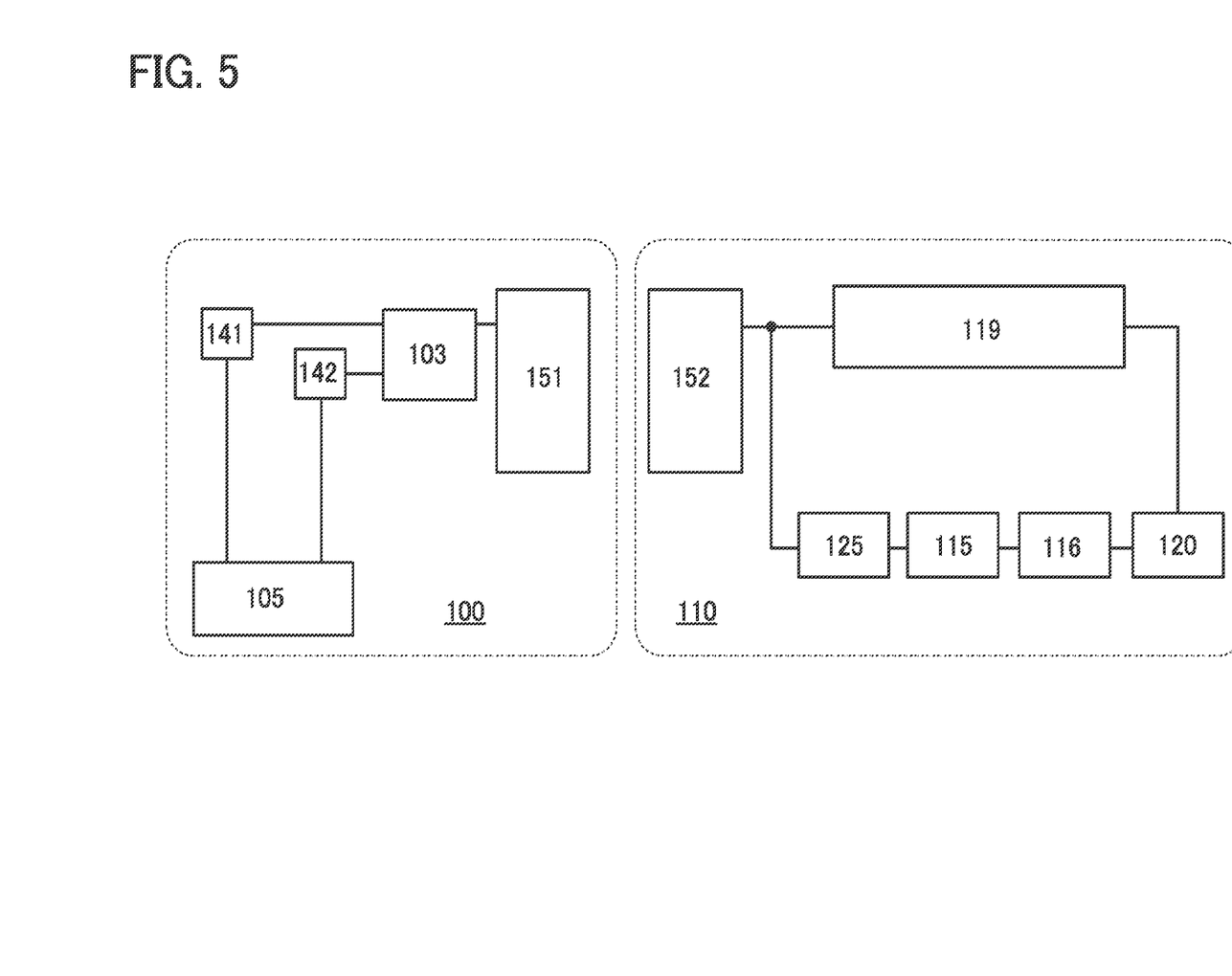
FIG. 5 illustrates a power feeding system.

FIG. 5 is a block diagram of a power feeding system of this embodiment in which communication and power feeding are performed at the same time. The power feeding system illustrated in FIG. 5 includes a power transmitting device 100 and a power receiving device 110.

In the power feeding system illustrated in FIG. 5, an electromagnetic wave generated in the power transmitting device 100 is amplitude-modulated and with the use of the amplitude-modulated electromagnetic wave (modulation signal) wireless communication is performed between the power transmitting device 100 and the power receiving device 110. Note that a modulation signal that is transmitted from the power transmitting device 100 to the power receiving device 110 is a transmission signal. A modulation signal which is included in an electric wave reflected by the power receiving device 110 to the power transmitting device 100 is a response signal.

The power transmitting device 100 illustrated in FIG. 5 includes a modulation circuit 141, a demodulation circuit 142, a control circuit 105, a directional coupler 103, and a first antenna 151.

The power receiving device 110 illustrated in FIG. 5 includes a second antenna 152, a transformer 125, a rectifier circuit 115, a smoothing circuit 116, a power storage device 120, and a communication control unit 119.

<Specific Structure of Power Transmitting Device>

Figure 4:
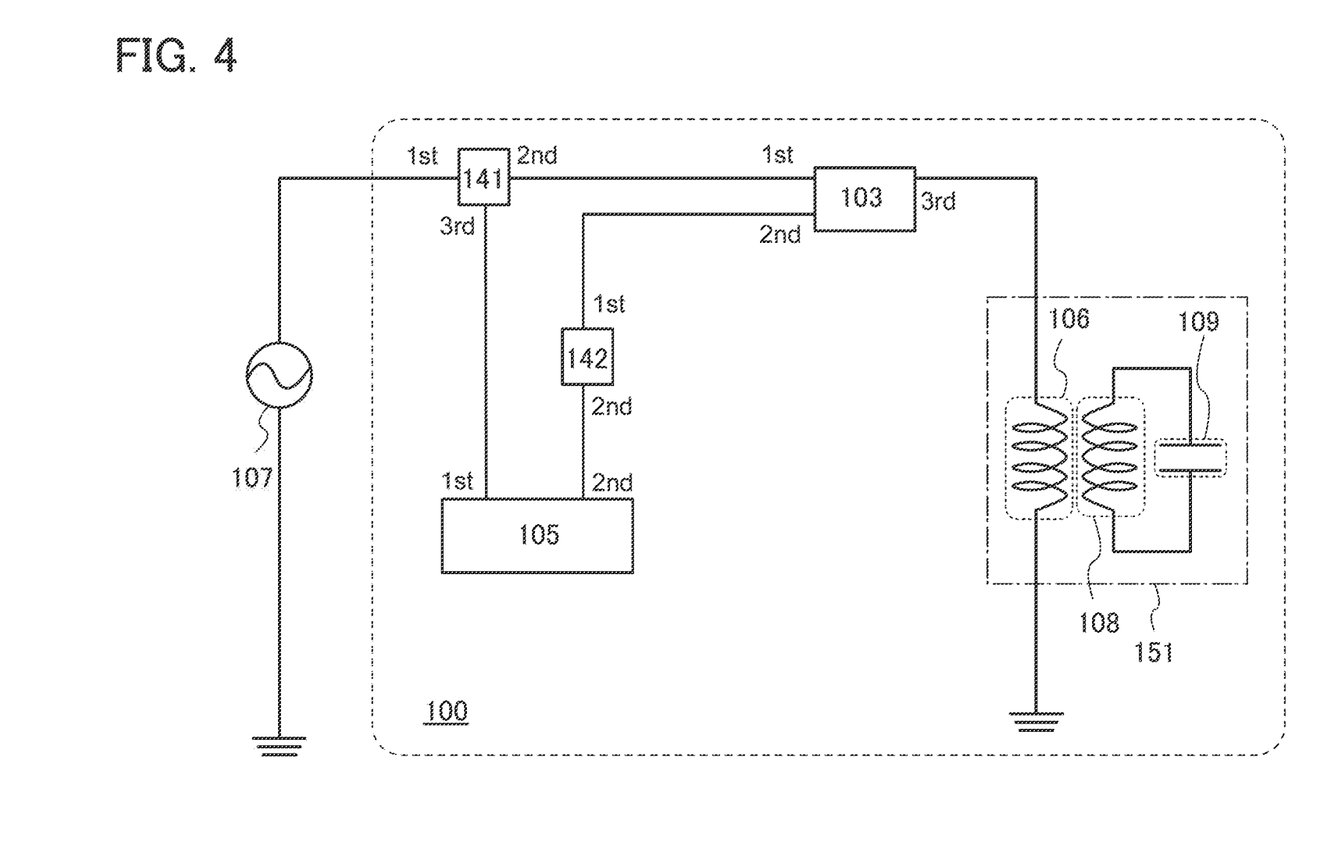
FIG. 4 illustrates a power transmitting device.

FIG. 4 illustrates a specific structure of the power transmitting device of this embodiment. The power transmitting device 100 illustrated in FIG. 4 includes the modulation circuit 141, the demodulation circuit 142, the control circuit 105, the directional coupler 103, and the first antenna 151. The first antenna 151 in FIG. 4 includes a first electromagnetic coupling coil 106, a first resonant coil 108, and a first capacitor 109. Although an AC power source 107 is provided outside the power transmitting device 100 in this embodiment, the AC power source 107 may be provided in the power transmitting device 100 if necessary.

In this embodiment, AC power which is generated in the AC power source 107 is transmitted from the first electromagnetic coupling coil 106 to the first resonant coil 108 by electromagnetic coupling. The first resonant coil 108 and the first capacitor 109 form a first LC resonant circuit. The AC power is transmitted from the first LC resonant circuit of the power transmitting device 100 to a second LC resonant circuit of the power receiving device 110 by resonance (LC resonance) between the first LC resonant circuit of the power transmitting device 100 and the second LC resonant circuit of the power receiving device 110 described later at the same frequency. Further, the AC power received by the second LC resonant circuit of the power receiving device 110 is transmitted from a second resonant coil 112 of the power receiving device 110 to a second electromagnetic coupling coil 113, which is described later, by electromagnetic coupling.

Note that in the case where the power is transmitted between the power transmitting device 100 and the power receiving device 110 using not a resonance phenomenon but electromagnetic coupling, the first resonant coil 108 and the first capacitor 109 of the power transmitting device 100 and the second resonant coil 112 and a second capacitor 111 of the power receiving device 110 are not necessarily provided. In the case where the transmission of the AC power between the power transmitting device 100 and the power receiving device 110 is performed using electromagnetic coupling, the transmission may be performed using electromagnetic coupling between the first electromagnetic coupling coil 106 of the power transmitting device 100 and the second electromagnetic coupling coil 113 of the power receiving device 110.

The AC power source 107 is a power source that generates high frequency AC power. A first terminal of the AC power source 107 is electrically connected to a first terminal of the modulation circuit 141. A second terminal of the AC power source 107 is grounded.

The modulation circuit 141 has a function of converting a transmission signal which is output from the control circuit 105 into a signal which can be wirelessly communicated. The first terminal of the modulation circuit 141 is electrically connected to the first terminal of the AC power source 107. A second terminal of the modulation circuit 141 is electrically connected to a first terminal of the directional coupler 103. A third terminal of the modulation circuit 141 is electrically connected to a first terminal of the control circuit 105.

The demodulation circuit 142 is a circuit having a function of converting a wireless signal (referred to as a response signal in this specification) from the power receiving device 110 into a signal which can be processed by the control circuit 105. A first terminal of the demodulation circuit 142 is electrically connected to a second terminal of the directional coupler 103. A second terminal of the demodulation circuit 142 is electrically connected to a second terminal of the control circuit 105.

The control circuit 105 has a function of generating the modulation signal (transmission signal) to be transmitted to the power receiving device 110 and a function of processing the modulation signal (response signal) which is send from the power receiving device 110 in response to the modulation signal (transmission signal) and which has the information of the power receiving device 110. The first terminal of the control circuit 105 is electrically connected to the third terminal of the modulation circuit 141. The second terminal of the control circuit 105 is electrically connected to the second terminal of the demodulation circuit 142.

The directional coupler 103 (also referred to as a coupler) can take out signals corresponding to a power transferred in a forward direction (traveling wave), a power transferred in the reverse direction (reflected wave), or the both thereof. The first terminal of the directional coupler 103 is electrically connected to the second terminal of the modulation circuit 141. The second terminal of the directional coupler 103 is electrically connected to the first terminal of the demodulation circuit 142. A third terminal of the directional coupler 103 is electrically connected to one terminal of the first electromagnetic coupling coil 106 of the first antenna 151.

The first electromagnetic coupling coil 106 has a function of transmitting AC power from the first electromagnetic coupling coil 106 to the first resonant coil 108 by electromagnetic coupling, as described above. The one terminal of the first electromagnetic coupling coil 106 is electrically connected to the third terminal of the directional coupler 103. The other terminal of the first electromagnetic coupling coil 106 is grounded.

The first LC resonant circuit has a function of transmitting AC power by being resonant (LC resonant) with the second LC resonant circuit of the power receiving device 110 at the same frequency. One terminal of the first resonant coil 108 is electrically connected to one terminal of the first capacitor 109. The other terminal of the first resonant coil 108 is electrically connected to the other terminal of the first capacitor 109.

Note that in the case where the transmission of the AC power between the power transmitting device 100 and the power receiving device 110 is performed using not a resonance phenomenon but electromagnetic coupling as described above, the transmission may be performed using electromagnetic coupling between the first electromagnetic coupling coil 106 of the power transmitting device 100 and the second electromagnetic coupling coil 113 of the power receiving device 110, and the first resonant coil 108 and the first capacitor 109 of the power transmitting device 100 and the second resonant coil 112 and the second capacitor 111 of the power receiving device 110 are not necessarily provided.

<Specific Structure of Power Receiving Device>

Figure 1:
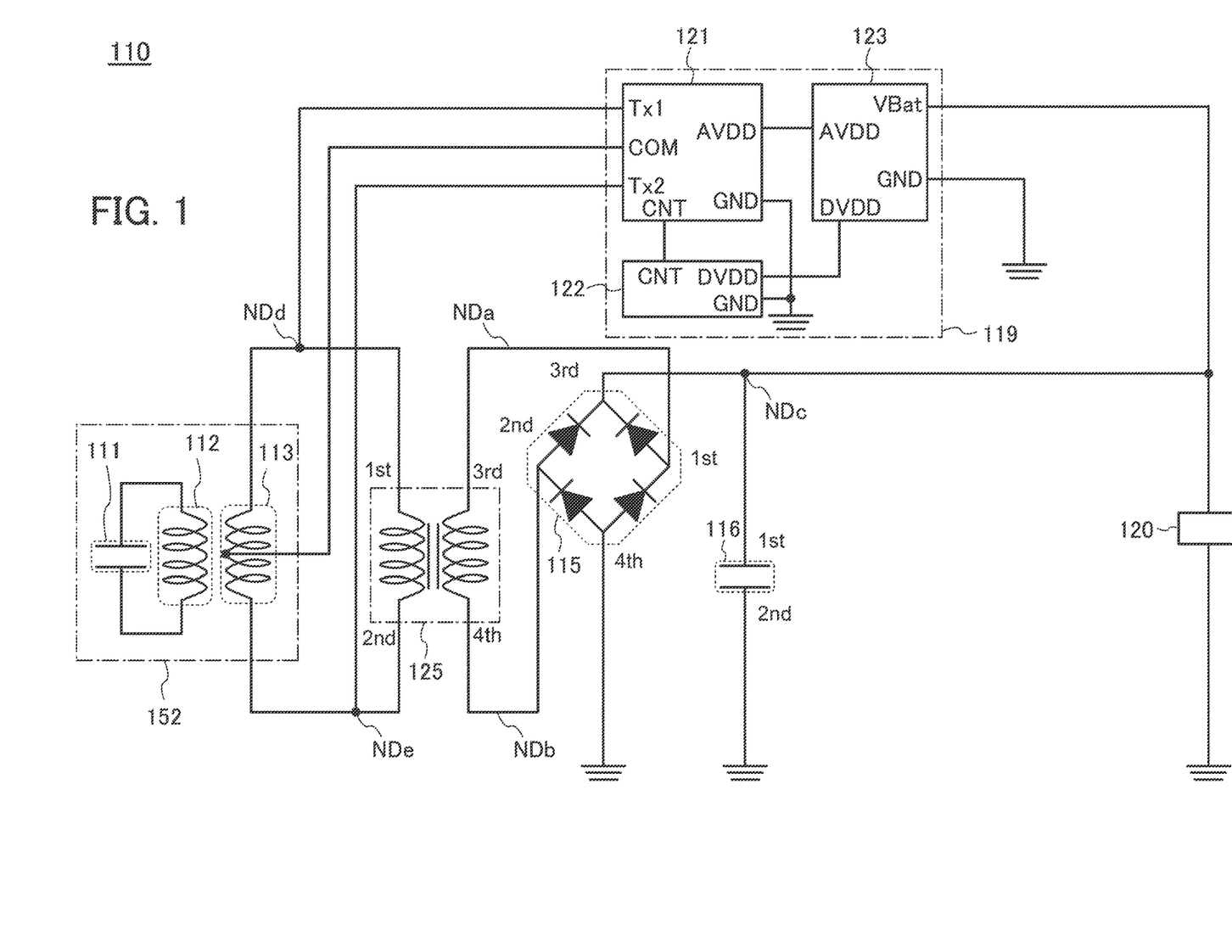
FIG. 1 illustrates a power receiving device.

FIG. 1 illustrates a specific structure of the power receiving device of this embodiment. The power receiving device 110 illustrated in FIG. 1 includes the second antenna 152, the transformer 125, the rectifier circuit 115, the smoothing circuit 116, the power storage device 120, and the communication control unit 119. The second antenna 152 in FIG. 1 includes the second electromagnetic coupling coil 113, the second resonant coil 112, and the second capacitor 111. The communication control unit 119 includes a reference voltage generator 123, a wireless interface portion 121, and a control circuit 122.

One terminal of the second resonant coil 112 is electrically connected to one terminal of the second capacitor 111. The other terminal of the second resonant coil 112 is electrically connected to the other terminal of the second capacitor 111. The second resonant coil 112 and the second capacitor 111 form the second LC resonant circuit.

One terminal of the second electromagnetic coupling coil 113, a terminal Tx1 of the wireless interface portion 121 of the communication control unit 119, and a first terminal of the transformer 125 are electrically connected to a node NDd. The other terminal of the second electromagnetic coupling coil 113, a terminal Tx2 of the wireless interface portion 121 of the communication control unit 119, and a second terminal of the transformer 125 are electrically connected to a node NDe. The center point of the second electromagnetic coupling coil 113 is electrically connected to a terminal COM of the wireless interface portion 121 of the communication control unit 119.

The transformer 125 is an electric device which converts the level of the potential of AC power using electromagnetic induction. As the transformer 125, a transformer which has two coils, i.e., a first coil (on the input side) and a second coil (on the output side) is used in this embodiment. The first coil and the second coil have the same number of turns. When the first coil and the second coil have the same number of turns, a voltage amplitude of the AC power can be constant and the reference voltage of the AC power can be different between before and after input to the transformer 125.

In the transformer 125 of this embodiment, one terminal of the first coil is a first terminal of the transformer 125, the other terminal of the first coil is a second terminal of the transformer 125, one terminal of the second coil is a third terminal of the transformer 125, and the other terminal of the second coil is a fourth terminal of the transformer 125.

The rectifier circuit 115 functions as an AC-DC converter which converts AC power into DC power. To obtain high rectification efficiency, full-wave rectification is preferably used for the rectifier circuit 115. The rectifier circuit 115 illustrated in FIG. 1 is a bridge rectifier circuit including four diodes. A first terminal of the rectifier circuit 115 and the third terminal of the transformer 125 are electrically connected to a node NDa. A second terminal of the rectifier circuit 115 and the fourth terminal of the transformer 125 are electrically connected to a node NDb. A third terminal of the rectifier circuit 115, a first terminal of the smoothing circuit 116, a positive electrode of the power storage device 120, and a terminal VBat of the reference voltage generator 123 of the communication control unit 119 are electrically connected to a node NDc. A fourth terminal of the rectifier circuit 115 is grounded.

The potentials of the node NDa, the node NDb, the node NDc, a node NDd, and the node NDe are a potential Va, a potential Vb, a potential Vc, a potential Vd, and a potential Ve, respectively.

The smoothing circuit 116 has a function of smoothing DC power which is output from the rectifier circuit 115 by storing and releasing the DC power. In the power receiving device 110 in FIG. 1, a capacitor is used as the smoothing circuit 116. A second terminal of the smoothing circuit 116 is grounded. Note that the smoothing circuit 116 is not necessarily provided unless needed.

The power storage device 120 has a function of storing the DC power which has been obtained by rectification with the rectifier circuit 115 and smoothed by the smoothing circuit 116. A negative electrode of the power storage device 120 is grounded.

The communication control unit 119 analyzes the modulation signal (transmission signal) included in the AC power which has been transmitted from the power transmitting device 100 to the power receiving device 110. The communication control unit 119 analyzes the modulation signal by reading amplitude modulation of the voltage amplitude of the input AC power. Thus, the power receiving device 110 can receive information of the power transmitting device and an instruction which are included in the modulation signal.

Note that the power receiving device 110 which has received the AC power including the modulation signal (transmission signal) transmits reflection power to the power transmitting device 100. The reflection power includes a modulation signal (response signal) including information of the power receiving device 110. The power transmitting device 100 receives the reflection power including the response signal and analyzes the response signal, thereby obtaining the information of the power receiving device 110. In this manner, the communication between the power transmitting device 100 and the power receiving device 110 is established.

The reference voltage generator 123 of the communication control unit 119 has a function of generating reference potentials of the wireless interface portion 121 and the control circuit 122 from the obtained DC power and a ground potential GND. The terminal VBat of the reference voltage generator 123 is electrically connected to the third terminal of the rectifier circuit 115, the first terminal of the smoothing circuit 116, and the positive electrode of the power storage device 120. A terminal GND of the reference voltage generator 123 is grounded and supplied with the ground potential GND. A terminal AVDD of the reference voltage generator 123 is electrically connected to a terminal AVDD of the wireless interface portion 121. A terminal DVDD of the reference voltage generator 123 is electrically connected to a terminal DVDD of the control circuit 122.

A potential AVDD which is generated from the DC power by the reference voltage generator 123 is supplied to the wireless interface portion 121 via the terminal AVDD of the reference voltage generator 123 and the terminal AVDD of the wireless interface portion 121. The potential AVDD and the ground potential GND serve as the reference potential of the wireless interface portion 121. A potential DVDD which is generated from the DC power by the reference voltage generator 123 is supplied to the control circuit 122 via the terminal DVDD of the reference voltage generator 123 and the terminal DVDD of the control circuit 122. The potential DVDD and the ground potential GND serve as the reference potential of the control circuit 122.

The wireless interface portion 121 is a circuit which includes a demodulation circuit which converts the modulation signal (transmission signal) from the power transmitting device 100 into a signal which can be processed by the control circuit 122, and a modulation circuit which converts the modulation signal (response signal) output from the control circuit 122 into a signal which can be wirelessly communicated. The terminal AVDD of the wireless interface portion 121 is electrically connected to the terminal AVDD of the reference voltage generator 123. The terminal COM of the wireless interface portion 121 is electrically connected to the center point of the second electromagnetic coupling coil 113. The ground potential GND is applied to the terminal GND of the wireless interface portion 121. A terminal CNT of the wireless interface portion 121 is electrically connected to a terminal CNT of the control circuit 122.

The control circuit 122 has a function of generating the modulation signal (response signal) including the information of the power receiving device 110 and a function of processing the modulation signal (transmission signal) sent from the power transmitting device 100. The terminal DVDD of the control circuit 122 is electrically connected to the terminal DVDD of the reference voltage generator 123. A terminal GND of the control circuit 122 is grounded and supplied with the ground potential GND. The terminal CNT of the control circuit 122 is electrically connected to the terminal CNT of the wireless interface portion 121.

Figure 2C:
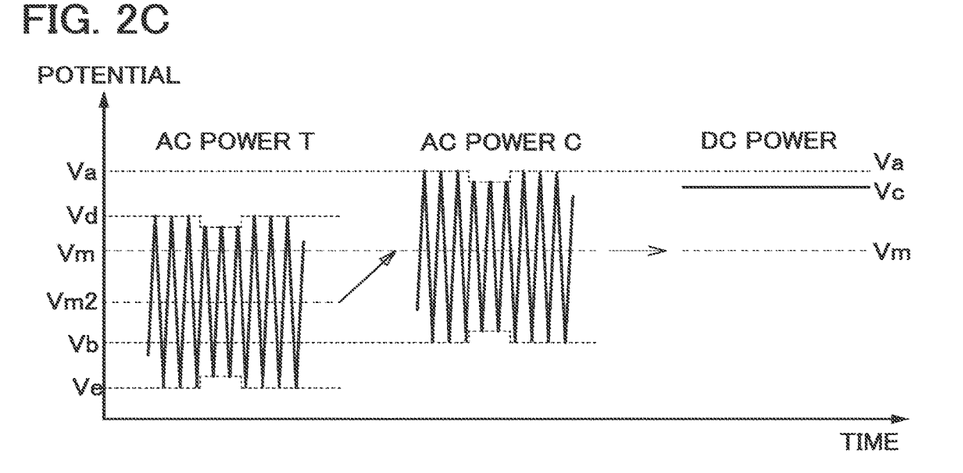

FIG. 2C shows changes in AC power in the case where the transformer 125 is provided between the second electromagnetic coupling coil 113 and the rectifier circuit 115.

In FIG. 2C, AC power which is input to the communication control unit 119 and includes the modulation signal (transmission signal) is referred to as AC power T, and AC power which is rectified into DC power by the rectifier circuit 115 is referred to as AC power C. The maximum potential and the minimum potential of the AC power T are the potential Ve and the potential Vf, respectively. The intermediate potential of the AC power T is a potential Vm2. The maximum potential and the minimum potential of the AC power C are the potential Va and the potential Vb, respectively. The intermediate potential of the AC power C is a potential Vm.

By providing the transformer 125 between the second electromagnetic coupling coil 113 and the rectifier circuit 115, the AC power T and the AC power C can be independent of each other. Specifically, the AC power C which has voltage amplitude of the AC power T and has a different intermediate potential from the AC power T can be supplied to the rectifier circuit 115. Note that the intermediate potential of the AC power T may be the same as that of the AC power C.

In other words, when the transformer 125 is provided, the potential Vm2 of the AC power T can be changed into the potential Vm and input to the rectifier circuit 115. Accordingly, the stable potential Vc with a small change can be supplied to the communication control unit 119.

DC power which is used for charging the power storage device 120 is generated from the AC power whose intermediate potential is the potential Vm (the AC power C). On the other hand, AC power which is input to the communication control unit 119 is the AC power T whose intermediate potential is the potential Vm2. The modulation signal (transmission signal) included in the AC power T is converted by the wireless interface portion 121 into a signal which can be processed by the control circuit 122.

Thus, even when communication and power feeding are performed at the same time, it is possible to stably perform the communication so that the AC power T for communication and the AC power C for power feeding do not interfere with each other.

Figure 6:
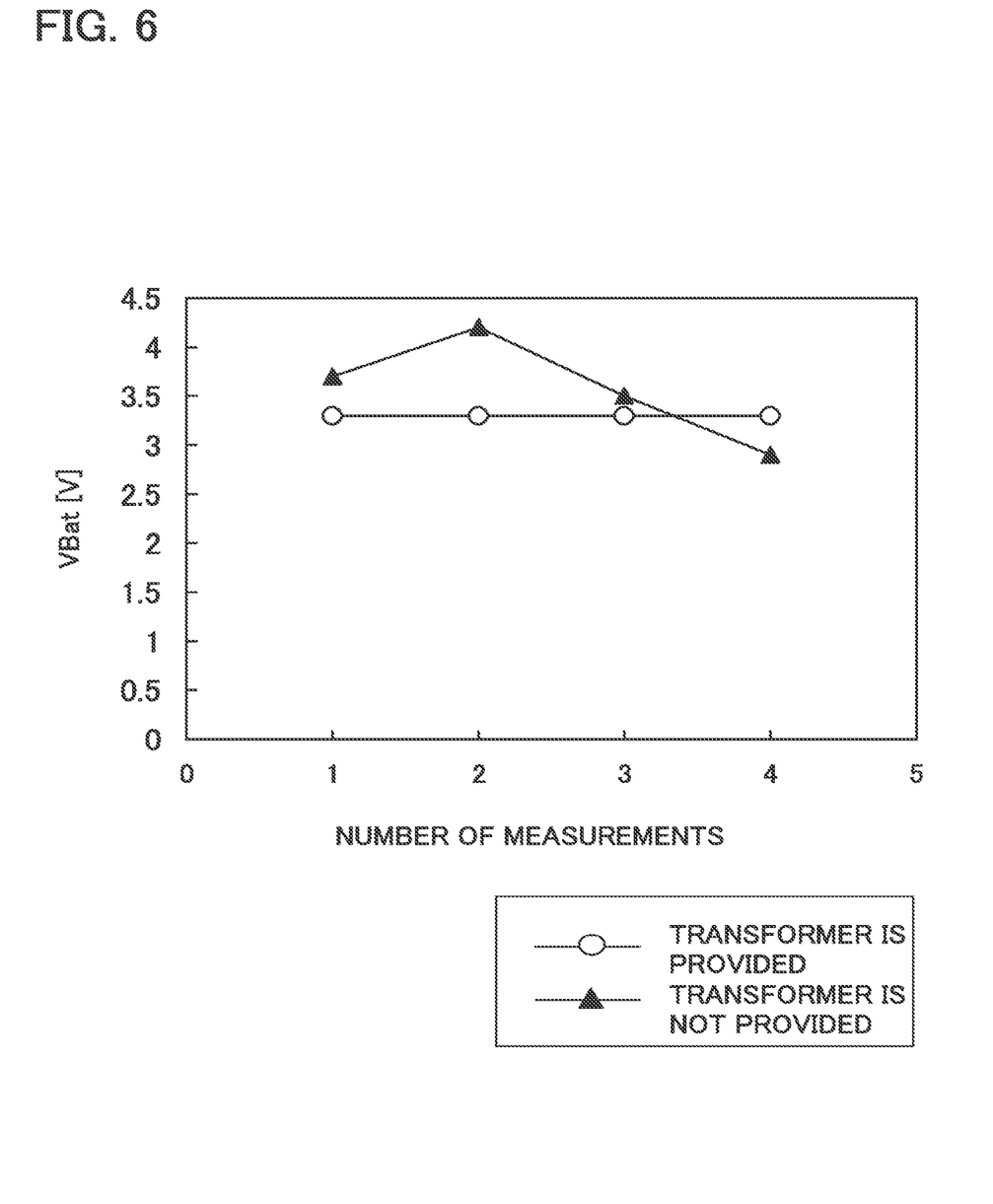
FIG. 6 shows changes in voltage value of DC power in the cases where a transformer is provided and where a transformer is not provided.

FIG. 6 shows changes in a potential VBat that is a reference potential of the communication control unit 119 in both cases of the power receiving device in which the transformer 125 is provided between the second electromagnetic coupling coil 113 and the rectifier circuit 115 and the power receiving device in which the transformer 125 is not provided. In FIG. 6, measurement in which power feeding and communication are performed at the same time is conducted four times. Further, in FIG. 6, the horizontal axis represents the number of times the measurement is conducted, and the vertical axis represents the value of the potential VBat.

In FIG. 6, the value of reception power is higher than or equal to 1.8 W and lower than or equal to 2.5 W in both cases where the transformer 125 is provided and where it is not provided.

As shown in FIG. 6, the potential VBat is kept constant (3.3 V) in the power receiving device in which the transformer 125 is provided. On the other hand, the potential VBat is not kept constant but fluctuates in the power receiving device in which the transformer 125 is not provided.

The fluctuating potential VBat indicates that the reference potential of the AC power which is not yet converted into DC power (the potential Vm in FIG. 2A) fluctuates. When AC power whose reference potential fluctuates is used for communication, there is a possibility that communication becomes unstable, and further communication is not established.

On the other hand, the potential VBat having a constant value indicates that the reference potential of the AC power for power feeding (the AC power C in FIG. 2C) is kept constant. Since the transformer is provided, the AC power for power feeding (the AC power C) and the AC power for communication (the AC power T) are separated, so that stable communication is possible.

As described above, a power receiving device and a power feeding system which are capable of performing communication and power feeding at the same time can be provided according to this embodiment.

Further, a power receiving device and a power feeding system which are capable of stably performing communication during power feeding can be provided.

Embodiment 2

In this embodiment, electric appliances to which the power feeding system in Embodiment 1 is applicable are described. Note that examples of electric appliances to which a power feeding system according to one embodiment of the present invention include portable electronic devices such as digital video cameras, portable information terminals (e.g., mobile computers, cellular phones, portable game consoles, and e-book readers), and image reproducing devices including a recording medium (specifically digital versatile disc (DVD) reproducing devices). In addition, the examples also include an electric propulsion moving vehicle that is powered by electric power, such as an electric car. Examples of such electronic appliances are described below with reference to FIGS. 7A and 7B.

Figure 7A:
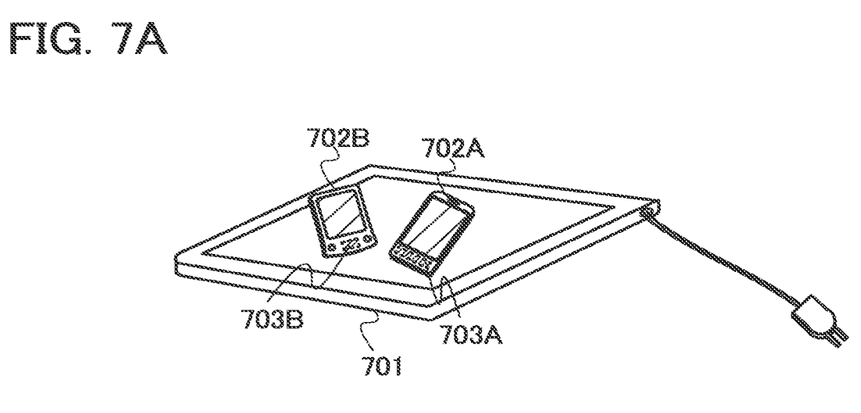
FIGS. 7A and 7B each illustrate an electric appliance to which a power feeding system is applicable.

FIG. 7A illustrates an application of a power feeding system to a cellular phone and a portable information terminal in which a power transmitting device 701, a cellular phone 702A including a power receiving device 703A, and a cellular phone 702B including a power receiving device 703B are included. The power feeding system in Embodiment 1 can be provided for the power transmitting device 701 and the power receiving devices 703A and 703B.

Figure 7B:
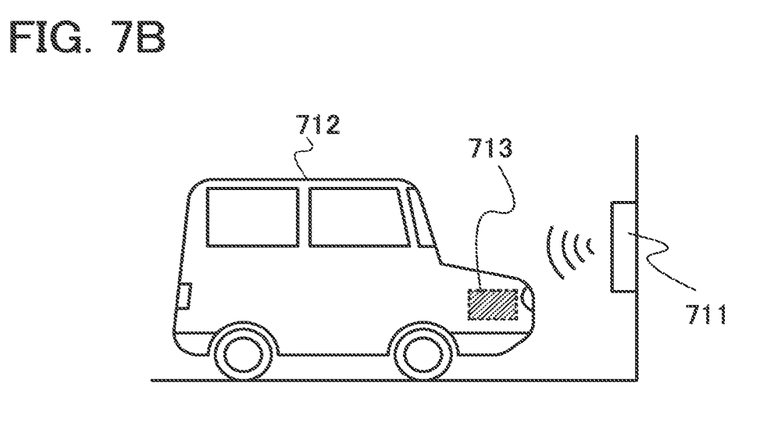

FIG. 7B illustrates an application of a power supply system to an electric car that is an electric propulsion moving vehicle in which a power transmitting device 711 and an electric car 712 including a power receiving device 713 are included. The power feeding system in Embodiment 1 can be provided for the power transmitting device 711 and the power receiving device 713.

As described above, according to this embodiment, a power receiving device and a power feeding system which are capable of performing communication and power feeding at the same time can be provided.

Further, according to this embodiment, a power receiving device and a power feeding system which are capable of performing stable communication during power feeding can be provided.

According to this embodiment, stable power feeding and communication to an electric appliance can be achieved.

This application is based on Japanese Patent Application serial no. 2012-069626 filed with Japan Patent Office on Mar. 26, 2012, the entire contents of which are hereby incorporated by reference.

What is claimed is:

1. A power receiving device comprising:
   an antenna configured to receive a first AC power and a modulation signal;
   a rectifier circuit configured to rectify the first AC power into a DC power;
   a communication control unit to which a second AC power comprising the modulation signal is input; and
   a transformer between the antenna and the rectifier circuit,
   wherein an voltage amplitude of the first AC power is the same as an voltage amplitude of the second AC power, and
   wherein an intermediate potential of the first AC power is different from an intermediate potential of the second AC power.

2. The power receiving device according to claim 1, wherein the communication control unit comprises:
   a control circuit configured to analyze the modulation signal;
   an interface portion configured to convert the modulation signal into a signal which can be analyzed by the control circuit; and
   a voltage generator configured to generate a reference potential of the control circuit and a reference potential of the interface portion, from a potential of the DC power and a ground potential.

3. The power receiving device according to claim 1, wherein the rectifier circuit comprises a first diode, a second diode, a third diode, and a fourth diode,
   wherein one terminal of the first diode is electrically connected to one terminal of the second diode,
   wherein the other terminal of the second diode is electrically connected to one terminal of the third diode,
   wherein the other terminal of the third diode is electrically connected to one terminal of the fourth diode, and
   wherein the other terminal of the fourth diode is electrically connected to the other terminal of the first diode.

4. The power receiving device according to claim 1, wherein the antenna comprises a first coil, a second coil, and a capacitor, wherein one terminal of the first coil is electrically connected to one terminal of the capacitor, and wherein the other terminal of the first coil is electrically connected to the other terminal of the capacitor.

5. The power receiving device according to claim 1, wherein one terminal of the antenna and a first terminal of the transformer are electrically connected to a fourth node, wherein the other terminal of the antenna and a second terminal of the transformer are electrically connected to a fifth node, wherein a maximum potential of the second AC power is a potential of the fourth node, and wherein a minimum potential of the second AC power is a potential of the fifth node.

6. The power receiving device according to claim 1, further comprising a power storage device configured to store the DC power, wherein a first terminal of the rectifier circuit and a third terminal of the transformer are electrically connected to a first node, wherein a second terminal of the rectifier circuit and a fourth terminal of the transformer are electrically connected to a second node, and wherein a third terminal of the rectifier circuit and one electrode of the power storage device are electrically connected to a third node.

7. The power receiving device according to claim 6, wherein a maximum potential of the first AC power is a potential of the first node, wherein a minimum potential of the first AC power is a potential of the second node, and wherein a potential of the DC power stored in the power storage device is a potential of the third node.

8. The power receiving device according to claim 6, wherein the communication control unit is configured to analyze the modulation signal and is driven using a potential of the DC power and a ground potential, and wherein the transformer is configured to change a reference potential of the second AC power.

9. The power receiving device according to claim 6, further comprising a smoothing circuit configured to smooth the DC power, wherein a first terminal of the smoothing circuit is electrically connected to the third node, and wherein a second terminal of the smoothing circuit is grounded.

10. The power receiving device according to claim 6, wherein a fourth terminal of the rectifier circuit and the other electrode of the power storage device are grounded.

11. An electronic appliance comprising the power receiving device according to claim 1.

12. A portable information terminal comprising the power receiving device according to claim 1.

13. A car comprising:

a car body; and a power receiving device provided inside the car body, wherein the power receiving device comprises:

an antenna configured to receive a first AC power and a modulation signal;

a rectifier circuit configured to rectify the first AC power into DC power;

a communication control unit to which a second AC power comprising the modulation signal is input; and a transformer between the antenna and the rectifier circuit, wherein an voltage amplitude of the first AC power is the same as an voltage amplitude of the second AC power, and wherein an intermediate potential of the first AC power is different from an intermediate potential of the second AC power.

14. The car according to claim 13, further comprising a power storage device configured to store the DC power, wherein a first terminal of the rectifier circuit and a third terminal of the transformer are electrically connected to a first node, wherein a second terminal of the rectifier circuit and a fourth terminal of the transformer are electrically connected to a second node, and wherein a third terminal of the rectifier circuit and one electrode of the power storage device are electrically connected to a third node.

15. The car according to claim 14, wherein a maximum potential of the first AC power is a potential of the first node, wherein a minimum potential of the first AC power is a potential of the second node, and wherein a potential of the DC power stored in the power storage device is a potential of the third node.

* * * * *